(12) United States Patent
Jansen et al.

(10) Patent No.: US 7,829,856 B2
(45) Date of Patent: Nov. 9, 2010

(54) APPARATUS AND METHODS FOR DETERMINING A SYSTEM MATRIX FOR PINHOLE COLLIMATOR IMAGING SYSTEMS

(75) Inventors: Floribertus Heukensfeldt Jansen, Ballston Lake, NY (US); Girish Bal, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 67 days.

(21) Appl. No.: 12/415,630

(22) Filed: Mar. 31, 2009

(65) Prior Publication Data
US 2010/0243907 A1    Sep. 30, 2010

(51) Int. Cl.
G21K 1/02    (2006.01)
(52) U.S. Cl. ............... 250/363.1; 250/363.04
(58) Field of Classification Search ............ 250/363.04, 250/363.1
See application file for complete search history.

(56) References Cited

U.S. PATENT DOCUMENTS

| 5,596,198 | A | 1/1997 | Perez-Mendez |
| 6,928,142 | B2 | 8/2005 | Shao et al. |
| 7,335,888 | B2 | 2/2008 | Wagenaar et al. |
| 7,385,200 | B2 | 6/2008 | Vija |
| 7,439,514 | B1 | 10/2008 | Uribe et al. |
| 2007/0297656 | A1 | 12/2007 | DeMan et al. |
| 2008/0166063 | A1 | 7/2008 | Zeng |

FOREIGN PATENT DOCUMENTS

WO    WO2007089962 A1    8/2007

OTHER PUBLICATIONS

Girish Bal and Paul D Acton, Analytical Derivation of the Point Spread Function for Pinhole Collimators, Institute of Physics Publishing, Physics in Medicine and Biology, Phys. Med. Biol. 51 (2006) 4923-4950. 28 pages.

van der Have et al., "System Calibration and Statistical Image Reconstruction for Ultra-High Resolution Stationary Pinhole SPECT", IEEE Transactions on Medical Imaging, vol. 27, No. 7, pp. 960-971, Jul. 2008.

*Primary Examiner*—David P Porta
*Assistant Examiner*—Mark R Gaworecki
(74) *Attorney, Agent, or Firm*—Scott J. Asmus

(57) ABSTRACT

Apparatus and methods for determining a system matrix for pinhole collimator imaging systems are provided. One method includes using a closed form expression to determine a penetration term for a collimator of the medical imaging system and determining a point spread function of the collimator based on the penetration term. The method further includes calculating the system matrix for the medical imaging system based on the determined point spread function.

32 Claims, 6 Drawing Sheets angle: 0; displacement: 0.0mm
angle: 10; displacement: -0.4mm
angle: 20; displacement: -1.0mm
angle: 30; displacement: -1.5mm
angle: 40; displacement: -2.1mm
angle: 50; displacement: -2.7mm

APPARATUS AND METHODS FOR DETERMINING A SYSTEM MATRIX FOR PINHOLE COLLIMATOR IMAGING SYSTEMS

BACKGROUND OF THE INVENTION

The subject matter disclosed herein relates generally to imaging systems, and more particularly, to pinhole collimators for nuclear medicine imaging systems and determining a system matrix for the pinhole collimator imaging systems.

Nuclear medicine imaging systems, for example, single photon emission computed tomography (SPECT) imaging systems, use one or more image detectors, sometimes many image detectors, such as gamma cameras to acquire image data (e.g., gamma ray or photon image data). Collimators are used in combination with the image detectors to select the direction from which incident gamma rays are accepted and reduce the effects, for example, of radiation from other parts of the body that can degrade image quality (e.g., cause image artifacts). Thus, collimators can improve spatial resolution.

Nuclear imaging systems with gamma cameras and pinhole collimators are increasingly being used for small animal and organ specific imaging in humans. A point spread function (PSF) of the gamma cameras is used to describe the photon count density distribution at the detector surface when a point source is imaged. Accurate modeling of the PSF is important for performing accurate image reconstruction, for example, of SPECT images. Accordingly, accurate modeling is important for resolution recovery, as well as for improving the quantitative accuracy of the reconstructed image. However, accurately determining the PSF of pinhole collimators is challenging as the PSF is a function of source location (shift-variant). One factor that contributes to the shift-variant nature of the PSF is the penetration of photons through the pinhole aperture.

Conventional reconstruction algorithms are either ray-driven or voxel driven. In these reconstruction algorithms, the PSF of the pinholes are usually modeled using a simpler shift-invariant PSF. The simplifications can cause distortions in the reconstructed images, as well as affect the quantification in the images. Different methods are also known to calculate a system matrix for a nuclear medicine imaging system. The system matrix generally defines the physics of the system. The known methods perform physical measurements to determine the system matrix. The measurements are acquired by moving a point source to different locations in the image space and saving multiple acquired projections. However, in order to obtain sufficient counts in the projection data, the total acquisition time to calculate the system matrix can be from four hours up to eighteen hours. In order to speed up the process, the system matrix is sometimes measured for intermediate points (e.g., 400 intermediate points) and the system matrix for the intermediate grid is determined using interpolation. This process is not capable of exactly determining the PSF for any point in the image space and can introduce errors.

Other known Monte-Carlo based methods are used wherein the pinhole is assumed to be formed from discrete steps. The photon flux through the pinhole aperture, as well as the collimator material, is then measured and stored as a system matrix. However, this method is computationally demanding and time consuming, resulting in a slow process that can also have discretization errors. The accuracy of the system matrix depends greatly on the model used to define the pinhole aperture.

BRIEF DESCRIPTION OF THE INVENTION

In accordance with an embodiment of the invention, a method for determining a system matrix for a medical imaging system is provided. The method includes using a closed form expression to determine a penetration term for a collimator of the medical imaging system and determining a point spread function of the collimator based on the penetration term. The method further includes calculating the system matrix for the medical imaging system based on the determined point spread function.

In accordance with another embodiment of the invention, a method for determining a system matrix for a medical imaging system is provided. The method includes determining a penetration term for a collimator of the medical imaging system without performing any measurements using the medical imaging system and determining a sensitivity term, including a geometric term and a penetration term, for shape of a point spread function for the collimator based on the penetration term. The method further includes calculating the system matrix for the medical imaging system based on the determined point spread function.

In accordance with yet another embodiment, a method for determining a system matrix for a medical imaging system is provided. The method includes determining parametric values where a plurality of planes that contain a voxel in an image space intersect a collimator and a detector of the imaging system and marking a location where the plurality of planes intersect a surface of the collimator as end points on the detector. The method further includes calculating the system matrix for the medical imaging system based on based on an inner most shape through which photons from a point source pass through the collimator and are detected.

In accordance with still another embodiment of the invention, a method for reducing the size of a system matrix for a medical imaging system is provided. The method includes calculating the system matrix for one or more geometric configurations of a collimator and detector of a medical imaging system, wherein the calculated system matrix for all locations in an image space based on one of linear and non-linear transformations is used. The method further includes recomputing a reduced system matrix for all angular views at one position of a table of the medical imaging system.

In accordance with another embodiment of the invention, a medical imaging system is provided that includes a plurality of nuclear medicine imaging detectors and a plurality of pinhole collimators attached to the plurality of nuclear medicine imaging detectors. The medical imaging system further includes an image reconstruction processor configured to reconstruct an image using a system matrix calculated based on an analytically derived pinhole penetration term.

DETAILED DESCRIPTION OF THE INVENTION

Figure 1:
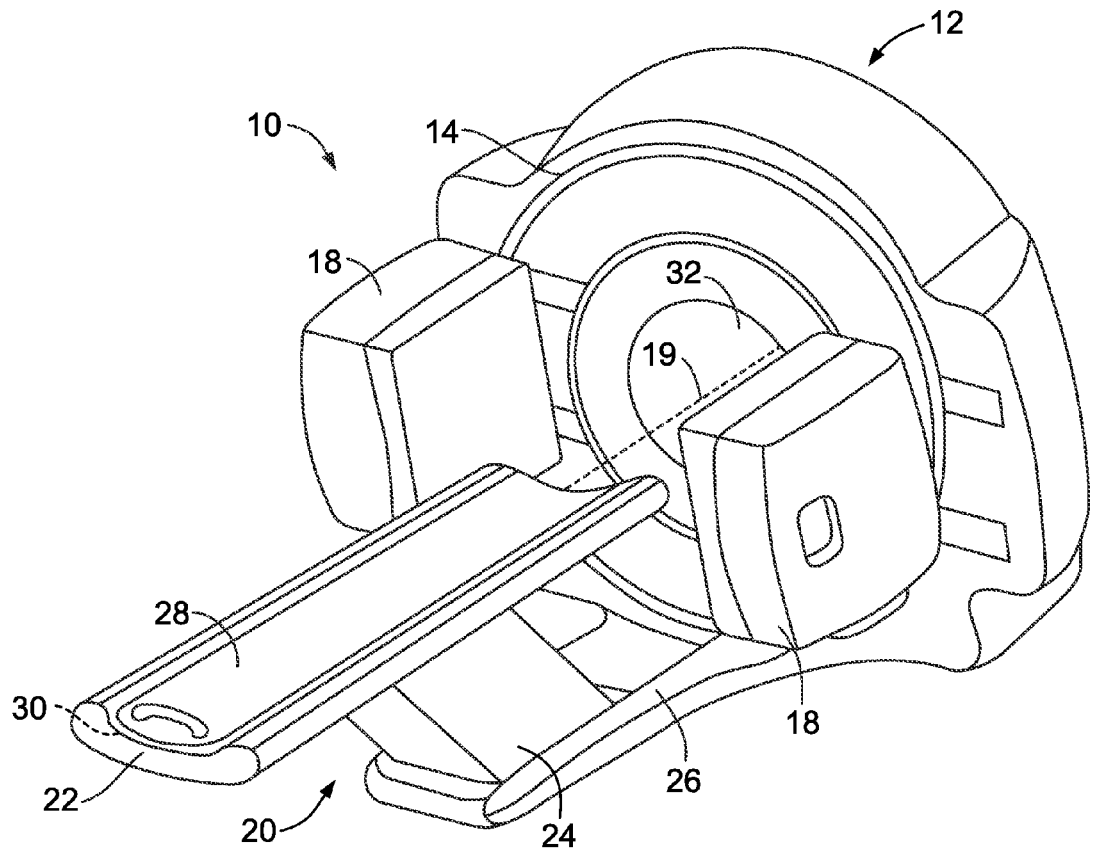
FIG. 1 is a perspective view of an exemplary nuclear medicine imaging system constructed in accordance with an embodiment of the invention.

The foregoing summary, as well as the following detailed description of certain embodiments of the present invention, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or a block of random access memory, hard disk, or the like). Similarly, the programs may be stand alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Various embodiments of the invention provide diagnostic imaging systems with imaging detectors and methods for determining the system matrix for the imaging systems. In particular, the various embodiments provide system matrix based reconstruction of pinhole collimator nuclear medicine imaging systems, in particular, single photon emission computed tomography (SPECT) imaging systems. The system matrix is determined based on the calculation of an analytical expression for the pinhole penetration term.

FIG. 1 is a perspective view of an exemplary embodiment of a medical imaging system 10 constructed in accordance with various embodiments of the invention, which in this embodiment is a nuclear medicine imaging system, and more particularly, a single photon emission computed tomography (SPECT) imaging system. The system 10 includes an integrated gantry 12 that further includes a rotor 14 oriented about a gantry central bore 32. The rotor 14 is configured to support one or more nuclear medicine (NM) cameras 18 (two cameras 18 are shown), such as, but not limited to gamma cameras or SPECT detectors. In various embodiments, the cameras 18 are formed from detectors, such as pixelated detectors. The rotors 14 are further configured to rotate axially about an examination axis 19. A patient table 20 may include a bed 22 slidingly coupled to a bed support system 24, which may be coupled directly to a floor or may be coupled to the gantry 12 through a base 26 coupled to the gantry 12. The bed 22 may include a stretcher 28 slidingly coupled to an upper surface 30 of the bed 22. The patient table 20 is configured to facilitate ingress and egress of a patient (not shown) into an examination position that is substantially aligned with examination axis 19. During an imaging scan, the patient table 20 may be controlled to move the bed 22 and/or stretcher 28 axially into and out of a bore 32. The operation and control of the imaging system 10 may be performed in any manner known in the art.

It should be noted that the various embodiments may be implemented in connection with imaging systems that include rotating gantries or stationary gantries.

Figure 2:
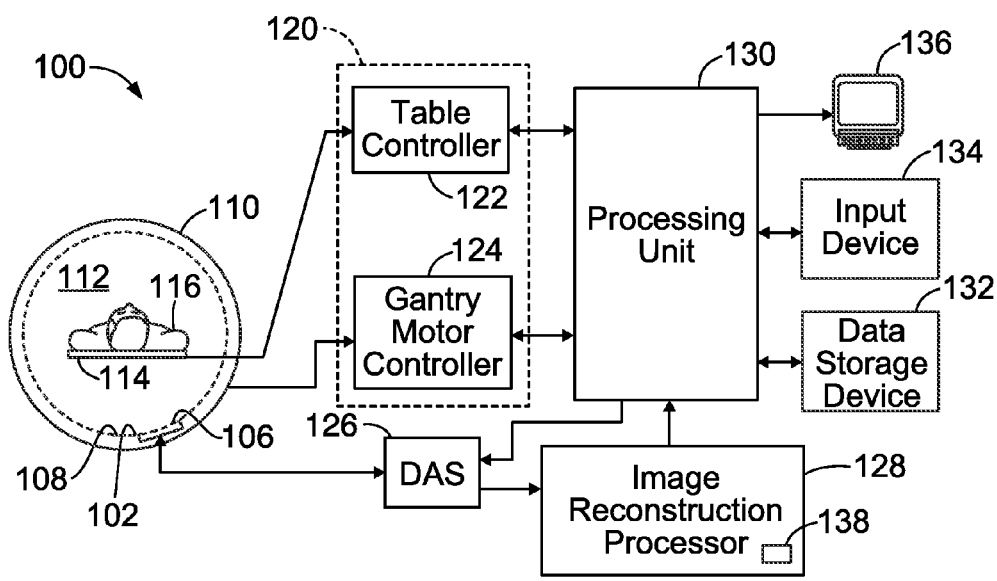
FIG. 2 is a schematic illustration of an exemplary nuclear medicine imaging system constructed in accordance with another embodiment of the invention.

FIG. 2 is a schematic illustration of an NM imaging system 100 that has a plurality of imaging detectors mounted on a gantry. In various embodiments, more than two imaging detectors are provided and are dimensionally smaller than the cameras 18 of the system 10 of FIG. 1. In FIG. 2, and for example, first, second, third through N imaging detectors 102, 104, 106 and 108 are mounted on a gantry 110. The cameras 18 of the system 10 are large enough to image most or all of a width of a patient's body at one time and may have a diameter of approximately 40 centimeters (cm) or more. Each of the first, second, third through N imaging detectors 102, 104, 106 and 108 are smaller than the cameras 18. Each of the first through N imaging detectors 102-108 may have a diameter of 1 cm to 50 cm and may be formed for example, of cadmium zinc telluride (CZT) tiles to define, for example, pixelated detectors. The first through N imaging detectors 102-108 may be of different sizes and/or shapes with respect to each other, such as square, rectangular, circular or other shapes. By positioning multiple imaging detectors at multiple positions with respect to a patient 116, radiation or imaging data specific to a structure of interest within the patient 116 may be acquired while limiting the amount of motion needed, or even without moving the imaging detectors relative to the patient 116.

Each of the first through N imaging detectors 102-108 may include, for example, 32×32 pixels. Each of the detectors 102-108 in one embodiment are stationary, viewing the structure of interest from one particular direction. However, the detectors 102-108 also may rotate about the gantry 110. Optionally, the detectors 102-108 are stationary and one or more collimators are rotated in front of one or more of the detectors 102-108. The collimators also may be stationary relative to the detectors 102-108. Different types of collimators are described in more detail below. Each detector captures a 1D or 2D image that may be defined by the x and y location of the pixel and the detector number. The measured data can also be in a list-mode format where each detected event is stored along with the time at which the event was detected.

Each of the first through N imaging detectors 102-108 has a radiation detection face (not shown) that is directed towards, for example, a structure of interest within the patient 116. One or more of the radiation detection faces are covered by a collimator (see FIGS. 3 through 6). An actual field of view (FOV) of each of the first through N imaging detectors 102-108 may be directly proportional to the size and shape of the respective imaging detector 102-108, or may be changed using a collimator.

The gantry 110 may have a bore 112 therethrough. A patient table 114 is configured with a support mechanism (not shown) to support and carry the patient 116, optionally, in a plurality of viewing positions within the bore 112 and relative to the first through N imaging detectors 102-108. Alternatively, the gantry 110 may include a plurality of gantry segments (not shown), each of which may independently move one imaging detector or a subset of imaging detectors. The gantry 110 also may be configured in other shapes, for example, as a "C" or "L", and may be rotatable about the patient 116. A controller unit 120 may control the movement and positioning of the patient table 114, the gantry 110 and/or the first through N imaging detectors 102-108 with respect to each other to position the desired anatomy of the patient 116 within the FOVs of the first through N imaging detectors 102-108 prior to acquiring an image of the anatomy of interest. The controller unit 120 may have a table controller 122 and gantry motor controller 124 that may be automatically commanded by a processing unit 130, manually controlled by an operator, or a combination thereof. The gantry motor controller 124 may move the first through N imaging detectors 102-108 with respect to the patient 116 individually, in segments or simultaneously in a fixed relationship to one another. The table controller 122 may move the patient table 114 to position the patient 116 relative to the FOV of one or more of the first through N imaging detectors 102-108. Optionally, one or more collimators may be moved relative to the first through N imaging detectors 102-108.

The first through N imaging detectors 102-108, gantry 110, and patient table 114 remain stationary after being initially positioned, and imaging data is acquired and processed as discussed below. The imaging data may be combined and reconstructed into a composite image, which may comprise two-dimensional (2D) images, a three-dimensional (3D) volume or a 3D volume over time (4D).

A data acquisition system (DAS) 126 receives electrical signal data produced by the first through N imaging detectors 102-108 and converts the data into digital signals for subsequent processing. An image reconstruction processor 128 receives the data from the DAS 126 and reconstructs an image using an image reconstruction process. The image reconstruction process uses a system matrix of the various embodiments as described in more detail below. A data storage device 132 may be provided to store data from the DAS 126 or reconstructed image data. An input device 134 also may be provided to receive user inputs and a display 136 may be provided to display reconstructed images.

The NM imaging system 100 also includes a system matrix processor 138 that determines a system matrix for use when reconstructing an image. The system matrix processor 138 uses an analytically derived pinhole penetration term calculated from a point spread function having a closed form expression (which also may be referred to as a closed form equation).

In various embodiments, the cameras 18 and the first through N imaging detectors 102-108 may be formed, for example, from photon detectors having one or more corresponding collimators. The various embodiments of determining a system matrix may be used to determine the point spread function (PSF) of imaging systems having different types of collimators. The photon detectors may be any type of photon detecting elements known in the art (e.g., pixelated detectors) and may be formed from different materials. In some embodiments, and for example as shown in FIGS. 3 through 6, a photon detector 150 may be provided.

Figure 3:
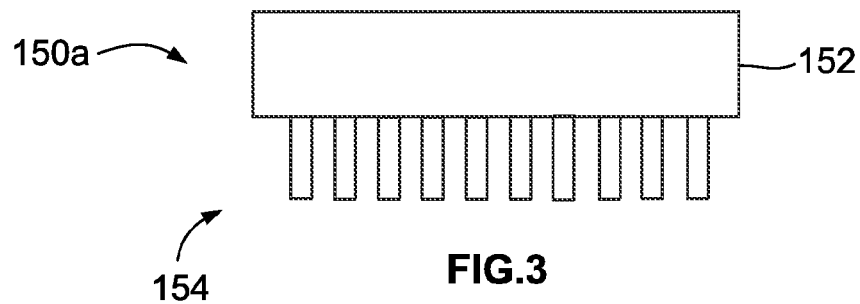
FIG. 3 is a diagram of a parallel hole collimator that may be used in the nuclear medicine imaging system of FIG. 1 or FIG. 2 and for which a point spread function (PSF) for use in a system matrix may be determined in accordance with various embodiments of the invention.

The detectors 150a-150d may be formed of any material. For example, any semiconductor material as known in the art, such as, cadmium zinc telluride (CdZnTe), often referred to as CZT, gallium arsenide (GaAs) and silicon (Si), among others. Specifically, the detectors 150a-150d each include a crystal 152 formed, for example, from a semiconductor material. A collimator, for example, a parallel hole collimator 154 may be attached to the detector 150a as shown in FIG. 3. The parallel hole collimator 154 may be formed, for example, from a flat sheet or cylindrical tube with multiple holes through the sheet. In some embodiments, the parallel hole collimator 154 is connected to a lead base (not shown), which is attached to the crystal 152.

Figure 4:
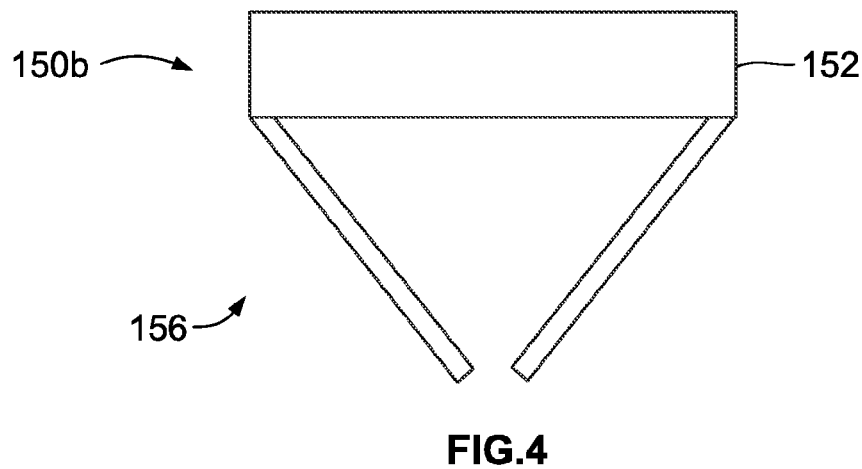
FIG. 4 is a diagram of pinhole collimator that may be used in the nuclear medicine imaging system of FIG. 1 or FIG. 2 and for which a PSF for use in a system matrix may be determined in accordance with various embodiments of the invention.
Figure 5:
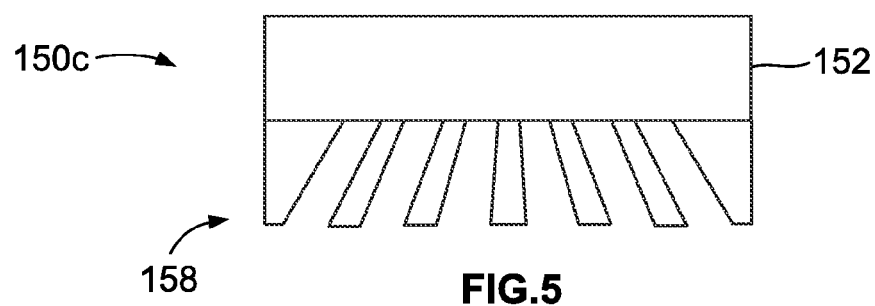
FIG. 5 is a diagram of a diverging collimator that may be used in the nuclear medicine imaging system of FIG. 1 or FIG. 2 and for which a PSF for use in a system matrix may be determined in accordance with various embodiments of the invention.
Figure 6:
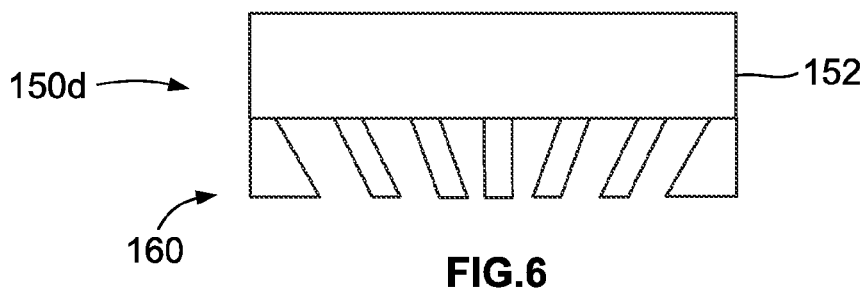
FIG. 6 is a diagram of a converging collimator that may be used in the nuclear medicine imaging system of FIG. 1 or FIG. 2 and for which a PSF for use in a system matrix may be determined in accordance with various embodiments of the invention.

As another example, as shown in FIG. 4, a pinhole collimator 156 may be attached to the crystal 152 of the detector 150b. As still other examples, focusing collimators may be used, such as a diverging collimator 158 as shown in FIG. 5 in connection with detector 150c or a converging collimator 160 as shown in FIG. 6 in connection with detector 150d. Parallel hole collimators 154 generally produce images having a one to one relation to the object being imaged. Diverging collimators 158 generally are used to acquire images of reduced size relative to the object being imaged and converging collimators 160 are used to acquire images of magnified size relative to the object being imaged. The number of openings in the collimators or the number of collimators may be varied as desired or needed.

It should be noted that the collimators may be made of different types of materials. In general, the collimators are formed from a material having a high atomic number, for example, tungsten or lead, with lead or lead alloys used in some embodiments.

Various embodiments of the invention determine the system matrix for a nuclear medicine imaging system, for example, the system 10 or 100. For example, the system matrix for a pinhole SPECT system may be determined using a closed form expression, for example, for defining the PSF of focusing collimators (e.g., collimators 158 and 160). The calculation of the system matrix generally includes combining a closed form expression for the PSF, the distance driven effect of the pixel onto the three-dimensional (3D) image space, the sensitivity of the voxel, calibration parameters and the effects of attenuation. System matrix based reconstruction accordingly can be performed using a system matrix determined in accordance with various embodiments of the invention.

It should be noted that when reference is made herein to a system matrix, this generally refers to a matrix that describes the probability that activity in a particular voxel in the image space is recorded by a particular pixel in the detector space. The system matrix is essentially a mathematical description of the physics of the system (e.g., physics of collimators of an imaging system, attenuation, geometrical calibration, etc.).

Figure 7:
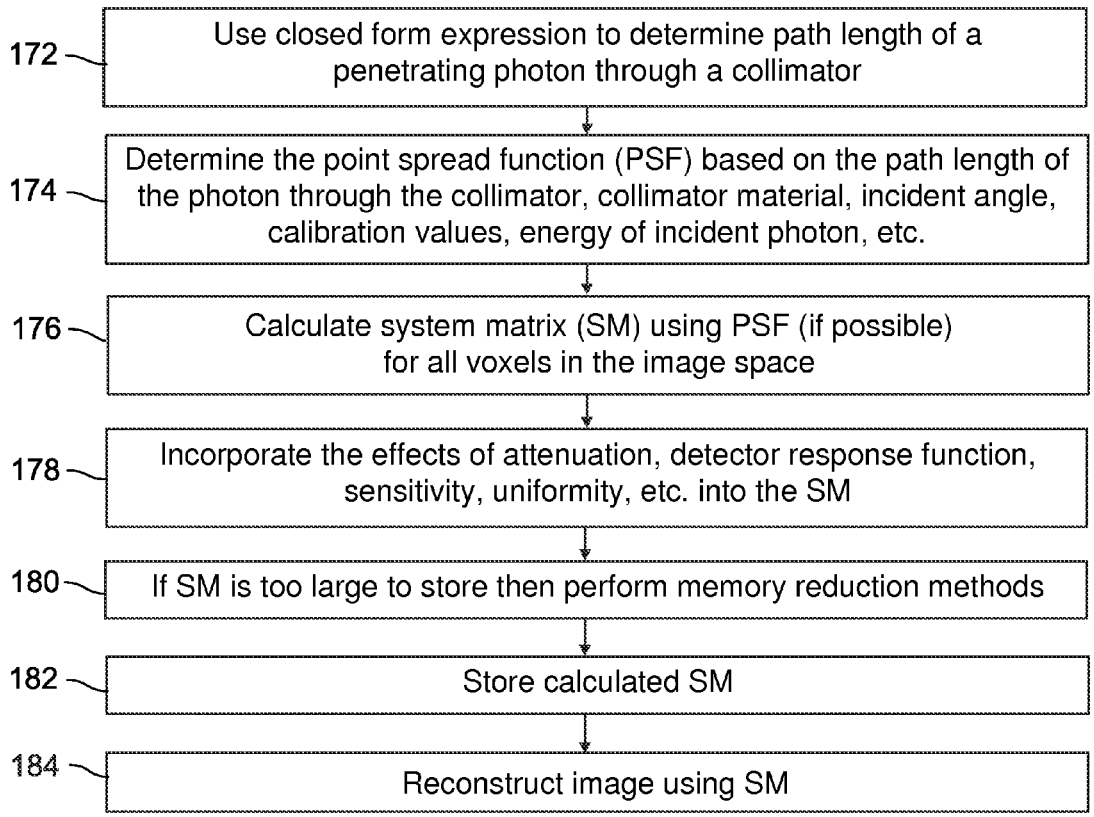
FIG. 7 is a flowchart of a method for determining a system matrix in accordance with various embodiments of the invention.

Specifically, a method 170 for determining a system matrix, for example, for a pinhole SPECT imaging system is shown in FIG. 7. More particularly, at 172 a closed form expression is used to determine the path length of a penetrating photon through a collimator, for example, a focusing pinhole collimator. The closed form expression may be any analytically derived expression modeling the collimator to determine the path length. For example, one closed form expression is described in "Analytical derivation of the point spread function for pinhole collimators" by Girish Bal and Paul D. Acton, *Phys. Med. Biol.* 51 (2006), pages 4923-4950 (hereafter Bal Article), the entire disclosure of which is hereby incorporated by reference herein. The path length $\Delta L$ of a photon through a collimator may be determined using the following closed form expression of the Bal Article:

$$\Delta L = \frac{\Delta t}{\sin\theta_a} = \frac{d_f \tan\alpha(N\sin\gamma + \cos\gamma) - (Q_1^2 - PR_1)^{1/2} - (Q_2^2 - PR_2)^{1/2}}{P(\csc^2\theta - 2\rho\cot\theta\cos(\beta - \phi/h + \rho^2/h^2)^{-1/2}},$$

where $P = M^2 + AN^2 - 2BN + C$; $M = \cot\theta\cos\phi - \rho\cos\beta/h$ $N = \cot\theta\sin\phi - \rho\sin\beta/h$; $A = \cos^2\gamma - \sin^2\gamma\tan^2\alpha$;

$B = \cos\gamma\sin\gamma(1 + \tan^2\alpha)$; $C = \sin^2\gamma = \cos^2\gamma\tan^2\alpha$;

$R_1 = \rho^2(\cos^2\beta + A\sin^2\beta) - \rho d_f \sin\beta\sin\gamma\tan\alpha - 0.25 d_f^2$;

$R_2 = \rho^2(\cos^2\beta + A\sin^2\beta) + \rho d_f \sin\beta\sin\gamma\tan\alpha - 0.25 d_f^2$;

$Q_1 = M\rho\cos\beta + \rho\sin\beta(AN-B) - 0.5 d_f \tan\alpha(N\sin\gamma + \cos\gamma)$;

$Q_2 = M\rho\cos\beta + \rho\sin\beta(AN-B) + 0.5 d_f \tan\alpha(N\sin\gamma + \cos\gamma)$.

It should be noted that a positive value for $\Delta L$ means that the photon passes through the pinhole collimator and a negative value for $\Delta L$ means that the photon is passing through the pinhole aperture.

Thereafter, at 174 the PSF is determined based on one or more of the determined path length of the photon through the collimator as determined, for example, from the closed form expression, incident angle, calibration values, energy of incident photon, etc. For example, and as described in the Bal Article, initializing all the negative values of $\Delta L$ to zero, the two-dimensional PSF for a focusing pinhole collimator may be determined using:

$$PSF = \sin^3\theta_a e^{-\mu\Delta L}/4\pi h^2.$$

It should be noted that the equations used herein to determine $\Delta L$ and the PSF are only exemplary and other equations may be derived by one of skill in the art. For example, the PSF can be approximated by an elliptical shape with a certain direction and magnitude of major and minor axes, and corresponding tapering of the penetration term towards these axes, respectively. Such a PSF is a slowly varying function of position and the coefficients of the PSF may be pre-computed and stored for a number of locations in the image space. Actual values of the PSF then can be quickly computed on the fly (e.g., while data is being acquired) by interpolating the coefficients.

Figure 8:
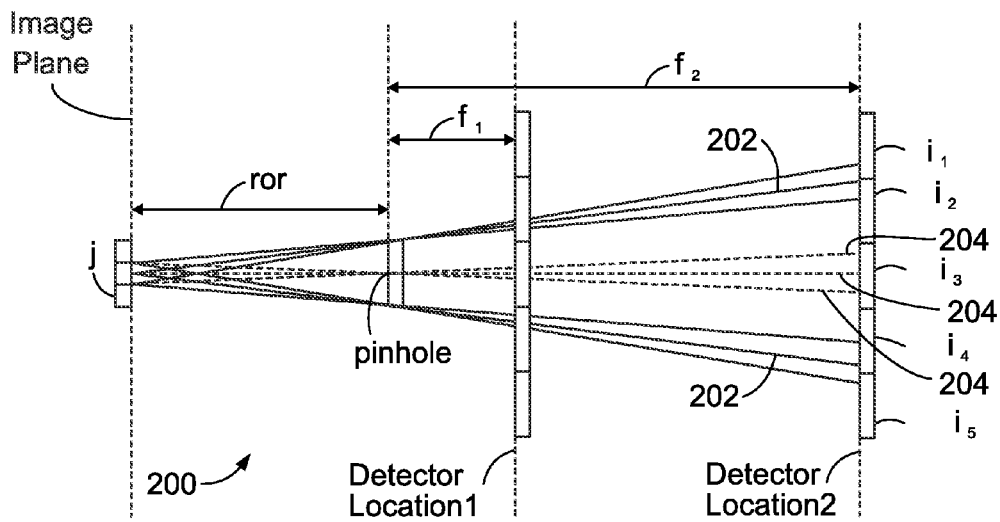
FIG. 8 is a schematic representation of the effects that contribute to a PSF in accordance with various embodiments of the invention.

The system matrix is then calculated (if possible) at 176 based on the PSF, and more particularly, the penetration term of the PSF, which may be based on $\Delta L$. A system matrix is formed that includes penetration term values based on the PSF, for example, for a plurality of different angles of incidence relative to each of the collimators. The system matrix defines, for example, correction terms for the penetration of photon through each collimator as determined by the PSF. Other parameters also may be included as part of the system matrix, as are known, may be added into the calculation of the PSF. In some embodiments, calibration parameters (as are known) are added to the PSF equation, for example, as error terms for the various spatial parameters defining the image and detector space. The system matrix from every voxel may be calculated by convolving the calculated PSF with a corresponding distance-driven based rect function. For example, as shown in FIG. 8, a schematic representation 200 of the PSF component 202 is illustrated after being convolved with a distance driven effect 204. The combined effect determines the shape of the PSF for any voxel in the image space. It should be noted that this determination can be extended to the volume space by combining the effect of the volume of a voxel in the image space onto the pixels in the projection space. Thus, at 178, different effects may be incorporated into the system matrix, such as the effects of attenuation, detector response function, sensitivity, uniformity, etc. For example, a matrix multiplication may be performed to the system matrix using the stored matrix and acquired or calculated attenuation terms. It should be noted that this incorporation of the effects of attenuation to the system matrix is performed only once per imaging scenario in the various embodiments.

Thereafter, if the system matrix is too large, for example, to store or use as part of the image reconstruction process (e.g., slows down the image reconstruction process to an unacceptable level to a user), then memory reduction methods are performed at 180. For example, the system matrix may be (i) determined for just the targeted volume of interest (VOI) and calculated on the fly for voxels outside the field of view, (ii) calculated for just one location of the table (e.g., patient table) and all angular views, with the thereafter stored system matrix modified based on table translation and used in the reconstruction, (3) stored as a set of parameters or (4) stored such that different elements of the system matrix are stored within a memory element (e.g., within a float, store the u,v and sensitivity values).

After the system matrix is calculated (an optionally reduced in size), the system matrix is stored with the analytically derived pinhole penetration term at 182. For example, the system matrix may be stored in a memory of a nuclear medicine imaging system. If an image is to be displayed, then at 184 an image is reconstructed using the precalculated system matrix stored in memory.

It should be noted that some of the major parameters that make the PSF of a pinhole collimator shift-variant are (1) the focusing angle of the pinhole collimator, (2) the attenuation coefficient of the collimator material and (3) the incidence angle of the photon. The various embodiments use a closed form expression to determine the path length of the penetrated photon through the collimator and hence determine the shape and PSF. This determination is particularly important for small pinholes (e.g., pinholes less than 1 mm in diameter) and high energy photons such as I-123 where more than 50 percent of the detected photons may be due to penetration. The effect of penetrated photons is even larger for isotopes such as I-131, where the contribution of the penetrated photons may be as high as 90 percent of the detected counts depending on the pinhole diameter, acceptance angle and material of the pinhole.

Using the various embodiments and the closed form expression in the calculation of the system matrix, the sensitivity of the pinhole system can be determined. This sensitivity term combines the effects of both the geometrically accepted as well as penetration photons. In the system matrix approach of the various embodiments, calibration parameters can be added into the PSF equation thereby eliminating, for example, multiple tri-linear interpolations during image reconstruction.

Figure 9:
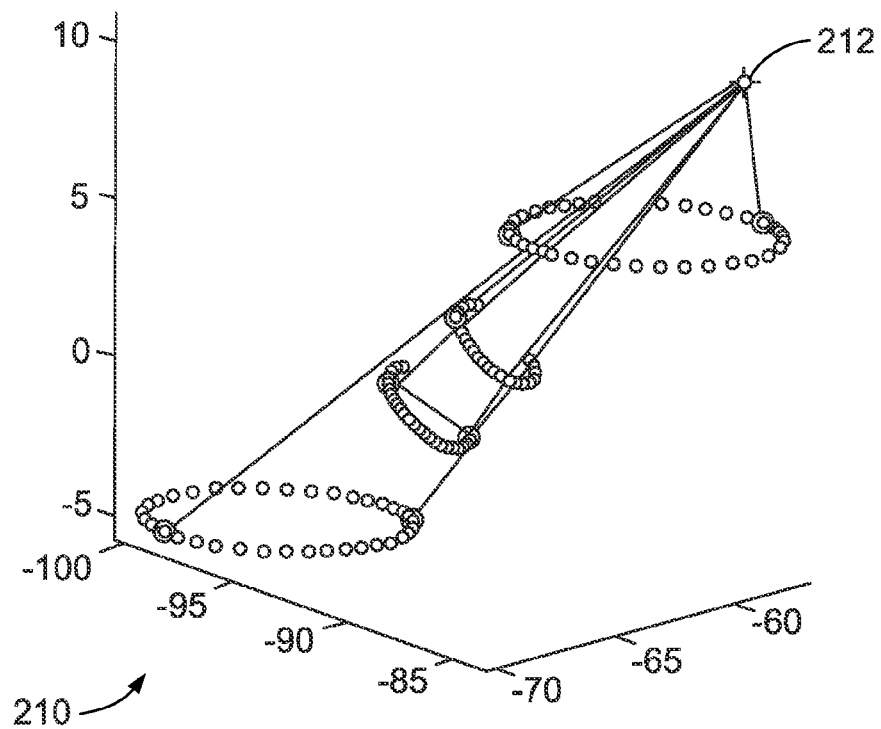
FIG. 9 is a graph illustrating a projection process to determine pinhole sensitivity in accordance with various embodiments of the invention.
Figure 10:
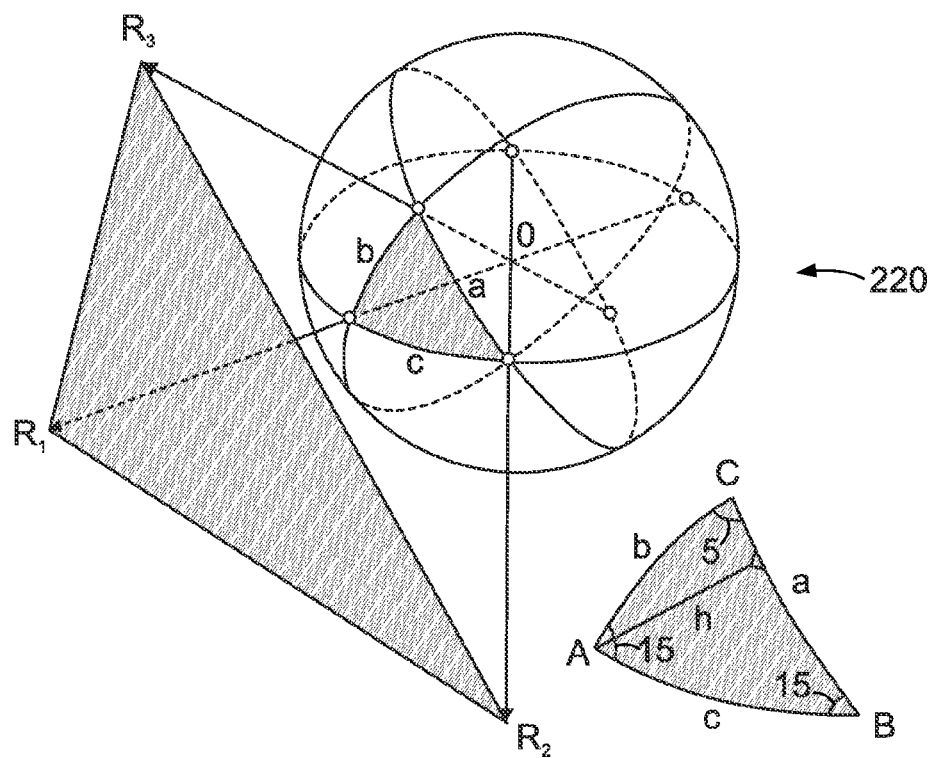
FIG. 10 is a diagram illustrating a sphere for computing a solid angle for determining pinhole sensitivity in accordance with various embodiments of the invention.

Thus, in accordance with some embodiments of the invention pinhole sensitivity can be determined as shown in FIGS. 9 and 10. Specifically, as shown in the graph 210 of FIG. 9 and the diagram of a sphere 220 as shown in FIG. 10, the pinhole sensitivity can be determined as: a solid angle subtended/$4\pi$. More particularly, in order to determine the pinhole sensitivity the following method may be performed:

1. Take a number of planar sections through the pinhole 212, and find intersections with edges.
2. Find the edge that is limiting sensitivity.
3. Project the limiting points onto a unit sphere.
4. Compute the solid angle as follows:

$$\tan\left(\frac{1}{2}\Omega\right) = \frac{[R_1 R_2 R_3]}{R_1 R_2 R_3 + (R_1 \cdot R_2)R_3 + (R_1 \cdot R_3)R_2 + (R_2 \cdot R_3)R_1}$$

Figure 11:
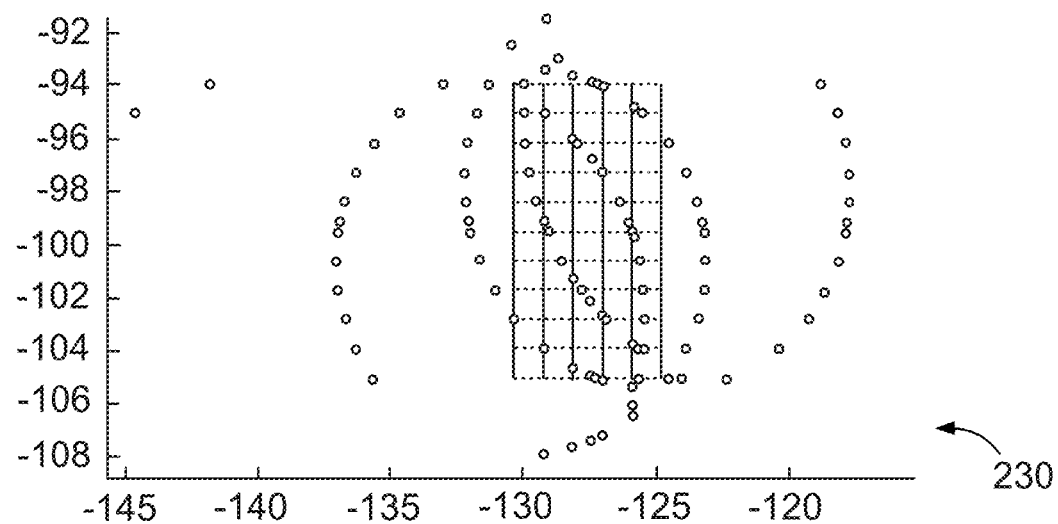
FIG. 11 is a graph illustrating a determination of a pinhole shadow in accordance with various embodiments of the invention.
Figure 12:
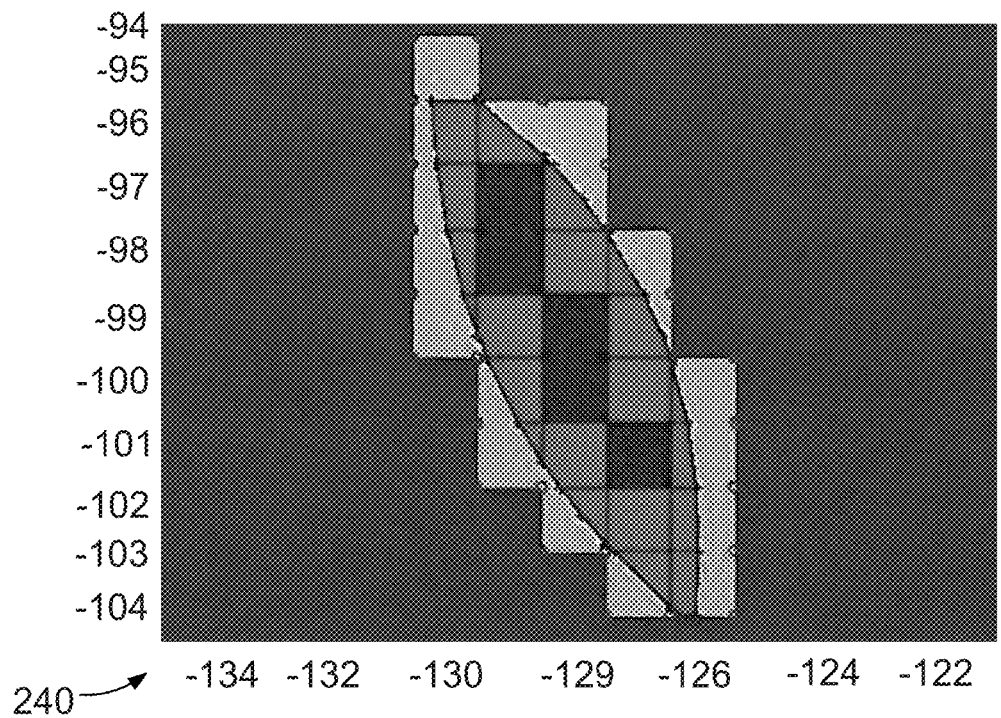
FIG. 12 is a graph illustrating the results of the determination of a pinhole shadow on a detector model in accordance with various embodiments of the invention.

Moreover, the shape of the pinhole "shadow" may be determined as illustrated in FIGS. 11 and 12. In particular, FIG. 11 is a graph 230 illustrating a pinhole shadow and FIG. 12 is a graph 240 illustrating a detector model. The "limiting edge" of the pinhole is projected onto the detector in some embodiments as follows:

1. Starting from the central ray, find the limiting intersections and project onto the detector.
2. Repeat the determination for pixel edges until no intersection is found.
3. Determine pixels that are "partially" and "fully" inside the shadow.
4. Compute the area of "partial" pixels inside the shadow.
5. Convert area into a solid angle.
6. Return the results to detector model.

Figure 13:
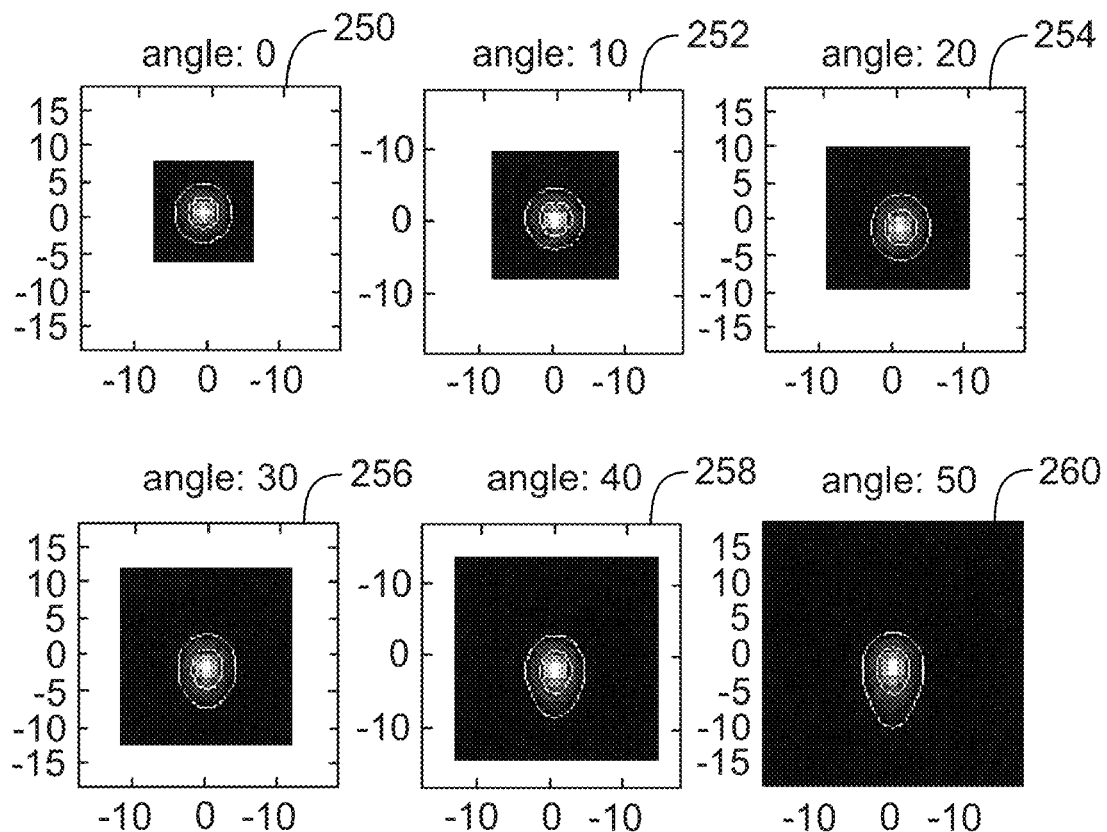
FIG. 13 illustrates graphs showing a detector PSF as a function of angle determined in accordance with various embodiments of the invention.

Thus, the detector PSF may be determined as a function of angle as shown in FIG. 13. Specifically, as shown in the graphs 250, 252, 254, 256, 258 and 260 corresponding to different angles, namely 0 degrees, 10 degrees, 20 degrees, 30 degrees, 40 degrees and 50 degrees, respectively, various embodiments may determine the detector PSF as a function of angle, which takes into account the direction and angle of incidence, the detector resolution and the crystal penetration. Accordingly, with various embodiments described herein, the PSF, loss of sensitivity and point spread displacement may be calculated. The value for the displacement for each of the different angles is also shown in FIG. 13.

At least one technical effect of the various embodiments is reducing the time to determine the system matrix for an imaging system, such as a nuclear medicine imaging system, using a pre-calculated system matrix determined based on a penetration term calculated from a closed term expression. Image reconstruction time is thereby reduced. Calibration errors may be incorporated into the system matrix to reduce the number of interpolation errors. Additionally, after the effects of the PSF and attenuation have been pre-computed, resolution recovery and attenuation correction can be applied in a single step.

It should be noted that modifications and variations to the various embodiments are contemplated. For example, the falloff term of the PSF (i.e., the half maximum of the penetration term) may be approximated as an elliptical shape and expressed, for example, as a parabolic or third order polynomial equation. The radial distance and angle of incidence may be determined using the polynomial and based on the minor and major axes of the elliptical shape. During estimation of the PSF, the pinhole may be modeled accordingly as using the various embodiments of the invention.

It also should be noted that a major drawback of using the system matrix based reconstruction is that the memory size needed to store the system matrix can be very large. In certain cases the memory may have to be about 60 GB and hence impossible to store in the computer Random Access Memory (RAM). To overcome this drawback, the system matrix can be calculated for certain geometric configurations of the collimator and detector. For example, in a helical acquisition the system matrix needs to be calculated for one circular rotation of the collimator/gantry. Then, the system matrix for the translation of the patient/animal table can modeled during reconstruction. This method will enable fast reconstruction as the number of terms needed to be calculated on the fly is very small.

In one embodiment of the algorithm, the algorithm is the variable pitch helical acquisition. In this geometry the collimator/gantry is rotated such that the measured angle between views are as far apart as possible (e.g., increased step size for adjacent views) or as a combination of some pseudo-random angle, leading to better angular sampling of the image space towards the start and end of the helical scan, thereby resulting in improved reconstructed images of the entire image space. Further the table increment can be varied so that the volume of interest (VOI) can be sampled for a longer acquisition time. The system matrix for the variable pitch-helical acquisition can be pre-computed for just a few angular views. Then, the system matrix of different table translations along the z-axis can be recomputed using the z-shift of the table and used in the reconstruction.

In another embodiment, the system matrix is pre-computed and stored only for certain voxels (e.g., voxels within the VOI). In this case, for the voxels not having the system matrix pre-computed (e.g., voxels outside the VOI), the projector/backprojector of the reconstruction algorithm is calculated on the fly. Accordingly, the reconstructed image has a high resolution and less quantitative errors within the VOI and at the same time the memory requirement is reduced.

Additionally, in some embodiments, to reduce the memory size needed for storing the system matrix, the values of the different elements of the system matrix can be approximated using a set of parameters. For example the shape of the point spread function can be approximated using geometric shapes or a combination of geometric shapes, such as a circle, ellipse and/or Gaussian, exponential function. Additional parameters such as radius, offset values, aspect ratios and amplitude of the function can be used to represent the system matrix.

In yet another embodiment, the image space is sequentially sampled in the same order both during the generation of the system matrix as well as during the reconstruction. In this way, the system avoids saving the voxel locations in the image space along with the system matrix, thereby reducing the memory needed.

The system matrix elements or the parameters can be stored using fewer memory elements by saving multiple parameters in the same byte, for example, by placing the horizontal and vertical location on the detector along with the sensitivity value of the system matrix as one unsigned long integer (or float, character, etc). Accordingly, the number of individual bits in the memory element can be predetermined to represent the various parameters of the system matrix. Apart from reducing the memory size, this approach can speed up reconstruction as multiple parameters are can be retrieved in the same memory call.

In still another embodiment, the system matrix can be calculated and stored for a certain number of predetermined locations in the image space. The system matrix in the intermediate region can be either calculated on the fly analytically/numerically or can be approximated using a set of parameters. Further, the system matrix can be calculated for a higher resolution (sampling) and based on the location of where the photons from the voxel strike the detector, and the highly sampled system matrix can be down sampled to that used on detector.

One approach to determine the parametric values of the system matrix is to consider multiple planes that contain a voxel in the image space and intersect the collimator (such as pinhole, keel hole, slit hole, parallel hole, fan beam cone beam, etc.) and the detector. The locations where these planes intersect the surface of the collimator are determined and the corresponding locations were marked as end points on the detector. The point spread function is determined as the inner most shape through which the photons from the point source passes through the collimator and is detected. The counts in this region are integrated to give the sensitivity term.

In addition, the penetration of the photons through the material can be modeled and added to the system matrix. Specifically, because the location on the detector where the edge of the different parts of the collimator intersect the plane (containing the point source) is known, the penetration of photons through the collimator material can be determined. For example, the path length of the photons through the collimator material can be calculated from the shape of the object for every location on the detector surface that lies between the projection of the edges of the collimator. This numerically calculated system matrix can be parameterized if desired as a combination of different functions and used during the reconstruction.

Thus, in accordance with various embodiments of the invention, system matrix based reconstruction may be provided using an exact equation, using a numerical approach and/or using memory reduction methods. For example, using an exact equation can include using the closed for expression as described herein and incorporating different effects, such as the effects of attenuation, detector response function, sensitivity, calibration parameters, etc.

With a numerical approach, parametric values are used to define a combination of different shapes that can result in the measured point spread function, for example the short and long axis of an ellipse, an offset value of the central ray, the location of the centroid, a vector direction of the incident photon, amplitude, etc, Thereafter the projection space is divided into a set of lines. Using a point source in the image space, planes that contain the point source and pass through the lines on the detector are determined. Then, the locations where the planes intersect the surface of the collimator holes are determined. The locations where the planes intersect the surface of the collimator holes can be marked on the detector. Polynomials that are common to all the marked points then may be determined. It should be noted that the geometrically accepted photons are the photons that lie within the inner most part of the different shapes on the detector. Because the location on the detector where the edge of the different parts of the collimator intersect the plane (containing the point source) is known, the penetration of photons through the collimator can be determined. For example, the path length of the photons through the collimator material can be calculated from the shape of the object for every location on the detector surface that lies between the projection of the edges of the collimator.

With the memory reduction methods, targeted VOI imaging may be performed, for example, by determining the system matrix for just the targeted VOI (which is precomputed and stored). The system matrix outside the VOI is calculated "on the fly", namely not predetermined or precalculated, but determined as factors or circumstances change, such as the patient table moves. An imaging geometry method optionally may be performed, for example, by calculating the system matrix for all angular location, but just one patient table location. Thereafter the system matrix is modified for various patient table locations as the patient table moves. The parametric values optionally may be stored "on the fly" try to determine the point spread function from the parametric values. Additionally, one memory element optionally may be used to store different parts of the system matrix. For example, if a 'float' element is stored as 64 bits in a computer memory, the first 16 bits can be used to save the u-axis location, the next 16 bits to store the v-axis location, the next 16 bits to store the sensitivity term, and the last 16 bits to store the scatter component for a photon emitted from a point in the image space.

Some embodiments of the present invention provide a machine-readable medium or media having instructions recorded thereon for a processor or computer to operate an imaging apparatus to perform one or more embodiments of the methods described herein. The medium or media may be any type of CD-ROM, DVD, floppy disk, hard disk, optical disk, flash RAM drive, or other type of computer-readable medium or a combination thereof.

The various embodiments and/or components, for example, the processors, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include RAM and Read Only Memory (ROM). The computer or processor further may include a storage device, which may be a hard disk drive or a removable storage drive such as a floppy disk drive, optical disk drive, and the like. The storage device may also be other similar means for loading computer programs or other instructions into the computer or processor.

As used herein, the term "computer" may include any processor-based or microprocessor-based system including systems using microcontrollers, reduced instruction set computers (RISC), application specific integrated circuits (ASICs), logic circuits, and any other circuit or processor capable of executing the functions described herein. The above examples are exemplary only, and are thus not intended to limit in any way the definition and/or meaning of the term "computer".

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the invention. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. For example, the ordering of steps recited in a method need not be performed in a particular order unless explicitly stated or implicitly required (e.g., one step requires the results or a product of a previous step to be available). While the dimensions and types of materials described herein are intended to define the parameters of the invention, they are by no means limiting and are exemplary embodiments. Many other embodiments will be apparent to those of skill in the art upon reviewing and understanding the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for determining a system matrix for a medical imaging system, the method comprising:
using a closed form expression to determine a penetration term for a collimator of the medical imaging system;
determining a point spread function of the collimator based on the penetration term; and
calculating the system matrix for the medical imaging system based on the determined point spread function.

2. A method in accordance with claim 1 further comprising convolving the collimator point spread function with a detector response for a detector of the medical imaging system.

3. A method in accordance with claim 1 further comprising convolving the collimator point spread function with a projection of a voxel onto a detector of the medical imaging system.

4. A method in accordance with claim 1 wherein determining a penetration term comprises analytically deriving the penetration term.

5. A method in accordance with claim 1 further comprising reconstructing an image based on the system matrix, wherein the system matrix is pre-calculated for use during image reconstruction.

6. A method in accordance with claim 1 further comprising performing an element by element multiplication of system matrix terms to incorporate attenuation factors to the system matrix.

7. A method in accordance with claim 1 wherein the collimator comprises a pinhole collimator.

8. A method in accordance with claim 1 wherein the collimator comprises a focusing pinhole collimator.

9. A method in accordance with claim 1 wherein the medical imaging system comprises a single photon emission computed tomography (SPECT) imaging system.

10. A method in accordance with claim 1 wherein the closed form expression defines a path length $\Delta L$ of a photon through a collimator as:

$$\Delta L = \frac{\Delta t}{\sin\theta_a} = \frac{d_f \tan\alpha(N\sin\gamma + \cos\gamma) - (Q_1^2 - PR_1)^{1/2} - (Q_2^2 - PR_2)^{1/2}}{P(\csc^2\theta - 2\rho\cot\theta\cos(\beta - \phi/h + \rho^2/h^2)^{-1/2}},$$

where $P = M^2 + AN^2 - 2BN + C;\ M = \cot\theta\cos\phi - \rho\cos\beta/h$ $N = \cot\theta\sin\phi - \rho\sin\beta/h;\ A = \cos^2\gamma - \sin^2\gamma\tan^2\alpha;$ $B = \cos\gamma\sin\gamma(1+\tan^2\alpha);\ C = \sin^2\gamma - \cos^2\gamma\tan^2\alpha;$ $R_1 = \rho^2(\cos^2\beta + A\sin^2\beta) - \rho d_f \sin\beta\sin\gamma\tan\alpha - 0.25 d_f^2;$ $R_2 = \rho^2(\cos^2\beta + A\sin^2\beta) + \rho d_f \sin\beta\sin\gamma\tan\alpha - 0.25 d_f^2;$ $Q_1 = M\rho\cos\beta + \rho\sin\beta(AN-B) - 0.5 d_f \tan\alpha(N\sin\gamma + \cos\gamma);$ $Q_2 = M\rho\cos\beta + \rho\sin\beta(AN-B) + 0.5 d_f \tan\alpha(N\sin\gamma + \cos\gamma).$ 11. A method in accordance with claim 1 further comprising using a precomputed system matrix from the calculating and incorporating a table translation into image reconstruction.

12. A method in accordance with claim 1 further comprising pre-computing the system matrix for voxels within a volume of interest (VOI) at a higher resolution and computing the system matrix for voxels outside the VOI as a lower resolution.

13. A method in accordance with claim 1 further comprising performing angular sampling with a variable step size and a variable translation step size for adjacent views of the medical imaging system.

14. A method for determining a system matrix for a medical imaging system, the method comprising:
   determining a penetration term for a collimator of the medical imaging system without performing any measurements using the medical imaging system;
   determining a sensitivity term, including a geometric term and a penetration term, for shape of a point spread function for the collimator based on the penetration term; and
   calculating the system matrix for the medical imaging system based on the determined point spread function.

15. A method in accordance with claim 14 wherein determining the shape of the point spread function comprises using a closed form expression to model the collimator.

16. A method in accordance with claim 14 wherein the determined penetration term comprises an analytically derived term.

17. A method in accordance with claim 14 wherein the collimator comprises a pinhole collimator.

18. A method in accordance with claim 14 further comprising adding attenuation factors to the system matrix using matrix multiplication.

19. A method in accordance with claim 14 further comprising convolving a distance driven based function, and calibration parameters and sensitivity terms, with the system matrix.

20. A method for determining a system matrix for a medical imaging system, the method comprising:
   determining parametric values where a plurality of planes that contain a voxel in an image space intersect a collimator and a detector of the imaging system;
   marking a location where the plurality of planes intersect a surface of the collimator as end points on the detector; and
   calculating the system matrix for the medical imaging system based on an inner most shape through which photons from a point source pass through the collimator and are detected.

21. A method in accordance with claim 20 wherein the penetration of the photon through the collimator is modeled by determining locations where edges of the collimator intersect a plane containing a point source and passes through a detector of the medical imaging systems.

22. A method in accordance with claim 21 wherein calculating a path length of photons through a material of the collimator from a shape of the collimator for each location on a surface of the detector lying between the projection of the edges of the collimator.

23. A method for reducing the size of a system matrix for a medical imaging system, the method comprising:
   calculating the system matrix for one or more geometric configurations of a collimator and detector of a medical imaging system, wherein the calculated system matrix for all locations in an image space based on one of linear and non-linear transformations is used; and
   precomputing a reduced system matrix for all angular views at one position of a table of the medical imaging system.

24. A method in accordance with claim 23 wherein the precomputing comprises using a variable-pitch-helical acquisition of the medical imaging system, wherein a collimator and gantry are rotated to varying view angles located as far apart as possible and a patient table is moved.

25. A method in accordance with claim 24 further comprising computing the system matrix for different table translations using a distance of the table motion.

26. A method in accordance with claim 23 further comprising precomputing the system matrix and storing the system matrix for voxels within a volume of interest (VOI), and for voxels outside the VOI calculating element for the system matrix using one of a fast approximation and precomputing for a larger interval between the voxels than initially used to precomputed the system matrix.

27. A method in accordance with claim 23 further comprising approximating values of different elements of the system matrix using a set of parameters, including at least one of a combination of geometric shapes and physical parameters, which include one of a radius, offset values, an aspect ratios and an amplitude.

28. A method in accordance with claim 23 further comprising sequentially sampling the image in a same order during generation of the system matrix and reconstruction.

29. A method in accordance with claim 23 further comprising storing one of system matrix elements and parameters by saving multiple values in a same memory location element.

30. A medical imaging system comprising:
   a plurality of nuclear medicine imaging detectors;
   a plurality of pinhole collimators attached to the plurality of nuclear medicine imaging detectors; and
   an image reconstruction processor configured to reconstruct an image using a system matrix calculated based on an analytically derived pinhole penetration term.

31. A medical imaging system in accordance with claim 30 wherein the analytically derived pinhole penetration term is calculated using a closed form expression.

32. A medical imaging system in accordance with claim 30 wherein the plurality of nuclear medicine imaging detectors comprise gamma cameras and the plurality of pinhole collimators comprise focusing pinhole collimators.

* * * * *

UNITED STATES PATENT AND TRADEMARK OFFICE
CERTIFICATE OF CORRECTION

PATENT NO. : 7,829,856 B2
APPLICATION NO. : 12/415630
DATED : November 9, 2010
INVENTOR(S) : Jansen et al.

Page 1 of 1

It is certified that error appears in the above-identified patent and that said Letters Patent is hereby corrected as shown below:

In Column 2, Lines 45-46, delete "recomputing" and insert -- precomputing --, therefor.

In Column 7, Line 23, delete " $P(\csc^2\theta - 2\rho\cot\theta\cos(\beta - \phi/h + \rho^2/h^2)^{-1/2}$ " and insert -- $P(\csc^2\theta - 2\rho\cot\theta\cos(\beta - \phi)/h + \rho^2/h^2)^{-1/2}$ --, therefor.

In Column 7, Line 27, delete "β/$h$" and insert -- β/$h$; --, therefor.

In Column 14, Line 41, in Claim 10,
delete " $P(\csc^2\theta - 2\rho\cot\theta\cos(\beta - \phi/h + \rho^2/h^2)^{-1/2}$ " and insert -- $P(\csc^2\theta - 2\rho\cot\theta\cos(\beta - \phi)/h + \rho^2/h^2)^{-1/2}$ --, therefor.

In Column 14, Line 45, in Claim 10, "β/$h$" and insert -- β/$h$; --, therefor.

In Column 16, Line 23, in Claim 26, delete "precomputed" and insert -- precompute --, therefor.

Signed and Sealed this
Fourteenth Day of June, 2011

David J. Kappos
*Director of the United States Patent and Trademark Office*